United States Patent [19]
Udert et al.
[11] 4,134,597
[45] Jan. 16, 1979

[54] HOLDER FOR SELF-DRILLING DOWELS

[75] Inventors: Karl-Ernst Udert, Triesen, Liechtenstein; Josef Entner, Frastanz, Austria

[73] Assignee: HILTI Aktiengesellschaft, Schaan, Liechtenstein

[21] Appl. No.: 808,727

[22] Filed: Jun. 21, 1977

[30] Foreign Application Priority Data

Jul. 5, 1976 [DE] Fed. Rep. of Germany ....... 2630116

[51] Int. Cl.[2] ........................ B23B 31/06; B23B 31/44
[52] U.S. Cl. .................................................... 279/103
[58] Field of Search ................... 279/103, 102, 96, 19, 279/19.6, 43, 51; 175/320

[56] References Cited

U.S. PATENT DOCUMENTS

| | | | |
|---|---|---|---|
| 1,597,404 | 8/1926 | Crossley | 279/96 X |
| 2,066,276 | 12/1936 | Harrall et al. | 279/43X |
| 2,359,286 | 10/1944 | Billger | 279/51 |
| 2,397,382 | 3/1946 | Smith | 279/102 X |
| 2,399,939 | 5/1946 | Phillips | 279/19 |
| 3,049,358 | 8/1962 | Polos | 279/102 |
| 3,082,014 | 3/1963 | Wohlhaupter et al. | 279/103 |
| 3,100,545 | 8/1963 | Zimmerman | 279/96 X |
| 3,534,970 | 10/1970 | Glimpel | 279/51 X |
| 3,863,940 | 2/1975 | Cummings | 279/43 X |

FOREIGN PATENT DOCUMENTS

| | | | |
|---|---|---|---|
| 1049193 | 9/1953 | Fed. Rep. of Germany | 279/43 |

*Primary Examiner*—Horace M. Culver
*Attorney, Agent, or Firm*—Toren, McGeady and Stanger

[57] ABSTRACT

A holder for a self-drilling dowel has a frusto-conically shaped bore for holding the locking-in cone on the dowel. The surface of the bore has three uniformly angularly spaced rounded recesses so that three relatively narrow strips of the surface provide contact with the locking-in cone.

9 Claims, 2 Drawing Figures

HOLDER FOR SELF-DRILLING DOWELS

SUMMARY OF THE INVENTION

The present invention is directed to a holder for self-drilling dowels and, more particularly, it is directed to a frusto-conically shaped bore in the holder for gripping the locking-in cone on the dowel. The smaller diameter end of the bore has a transversely extending, intersecting opening so that a tool can be inserted into the opening for expelling the locking-in cone from the bore.

For transmitting the torque required in the insertion process, the self-drilling dowels have a locking-in cone at the trailing end which is frictionally locked into a correspondingly shaped rigid bore in the holder.

Initially, for securing a self-drilling dowel into a receiving material, such as concrete, the dowel is driven under both rotational and impact action using cutting edges formed on its leading end for drilling its own bore. After forming the bore, the dowel is pulled out by means of the holder and, as a result, the frictional connection between the locking-in cone and the bore in the holder must be able to absorb the withdrawing stress. If the gripping force between the bore in the holder and the locking-in cone is not sufficient, the frictional connection will be lost and the dowel will not be able to be pulled out of the bore by the holder.

After the dowel is removed from the bore, an expansion cone is inserted into its leading end and it is introduced back into the bore by an impact action. After the dowel has been anchored due to the relative displacement between it and its expansion cone, the locking-in cone is broken off from the dowel by laterally displacing the tool used for applying the impact action to the holder. Since the locking-in cone is still held by the holder, it can be ejected by means of a suitable tool inserted into an opening extending transversely of and intersecting the base of the bore in the holder.

Especially with dowels of relatively large diameters, it has been found that during the manufacturing process a distortion occurs in the locking-in cone during heat treatment and the distortion evidences itself as a variation in the radial cross-section, for instance, the cross-section of the locking-in cone may vary from a circular form to an elliptical form. Moreover, the distortion may extend in the axial direction of the cone.

As a result of the distortion, there is an insufficient interconnection between the holder and the locking-in cone. As experience has shown, particularly in the case of large diameter dowels, such insufficient interconnection causes the dowels to become detached from the holder while being pulled out of the bore drilled in the receiving material. At the least, this results in an interruption of the dowel setting process. Attempts have been made to remove the dowels from the bore by use of an auxiliary tool and, if this does not work, the dowel can no longer be used and its use as an attaching member at that particular location in the receiving material is lost. Therefore, a primary object of the present invention is to provide a holder which ensures the optimum holding action on a self-drilling dowel even if the dowel's locking-in cone is distorted. In accordance with the present invention, adequate interconnection of the holder and the dowel is effected by providing the surface of the receiving bore in the dowel with three axially extending uniformly angularly spaced recesses dividing the holding surface of the bore into three axially extending, relatively narrow strips.

The three strips of the holder bore surface remaining between the recesses provide a well defined engagement for radially distorted locking-in cones. Because of the uniform spacing of the engagement surfaces, the dowel is properly centered in the holder so that the hole formed by the dowel is accurately drilled.

Preferably, the recesses are formed as rounded grooves which extend for a constant maximum depth into the wall of the holder forming the dowel receiving bore. By providing a sufficient depth of the rounded grooves, dirt and drilled material can be received in the grooves without impairing the exact three-point support of the locking-in cone within the bore.

The rounded grooves are particularly easy to form if their cross-section, taken transversely of the axis of the bore, has the shape of a circular segment. Grooves formed in this manner are relatively easy to clean and minimize any strength problems for the holder.

An especially exact gripping action by the holder on the locking-in cone of the dowel will be afforded, in accordance with the present invention, if the angular extent of the individual strips or portions of the surface of the bore holding the cone do not exceed 60 degrees. Any overlapping guiding action by the surface of the bore on the cone is avoided. As a practical matter the narrow strips of the bore surface holding the dowel cone can be so small that an almost linear contact is effected, however, giving preference for strength and wear reasons, an angular range of the narrow strips of 50 to 60 degrees is preferred.

Another feature of the invention is the provision of an annular groove concentric with the axis of the bore and formed in the bore surface intermediate its ends. With this groove, any distortions in the locking-in cone in the longitudinal or axial direction assures that exact contact is provided in both the front and rear portions of the bore with any axial distortion of the dowel being compensated. Advantageously, the annular depression or groove formed in the bore has an axial dimension being at most one-third of the total axial length of the bore in the holder. The depth of the annular groove is, for reasons of strength, adapted to the depth of the rounded grooves which extend in the axial direction of the bore.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
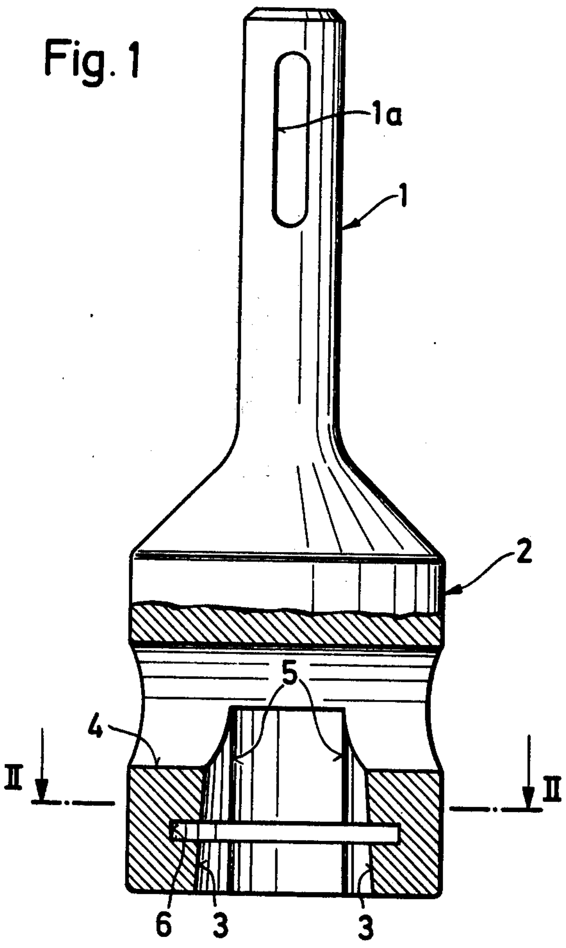
FIG. 1 is an elevational view, partly in section, of a holder embodying the present invention.
Figure 2:
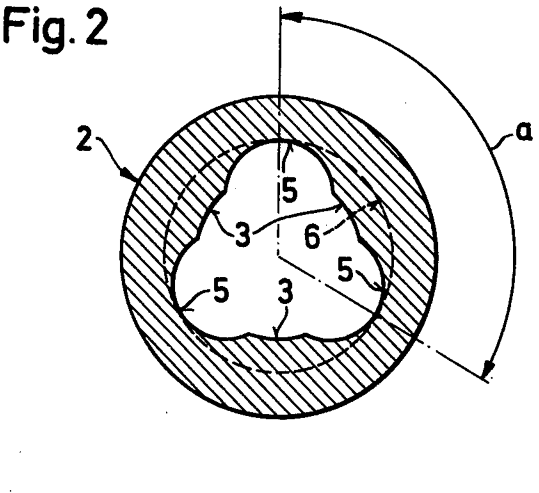
FIG. 2 is a sectional view taken along the line II—II in FIG. 1.

In FIG. 1 a holder for a self-drilling dowel is illustrated consisting of a shank 1 and a head 2 extending axially from the shank and having a greater diameter than the shank. The shank 1 of the holder is insertable into a percussion drilling tool, not shown, and a torque is transmitted from the tool to the shank via the entraining slots 1a. At its opposite end from the shank, the head 2 has a frusto-conically shaped bore 3 with its surfaces converging inwardly into the head. At the rearward end of the bore 3 an opening 4 extends perpendicularly of and intersects the inner end of the bore. After a locking-in cone has been broken off from a dowel, it is displaced from the bore by driving a known expelling tool through the opening 4. Within the bore 3, its surface has three axially extending rounded grooves 5, note FIG. 2, which are equiangularly spaced apart from one another by the anular distance a. As can be seen in FIG. 1, and as is shown in dotted lines in FIG. 2, an annular groove 6 is formed in and is concentric with the bore 3. The annular groove 6 is located intermediate the ends of the bore and has an axial length not exceeding one-third of the effective length of the bore. The annular groove 6 serves to compensate for any axial distortion in the locking-in cones of the dowels. As can be seen in FIG. 2 the depth of the groove 6 into the wall forming the bore in the holder is equal to the maximum depths of the rounded grooves 5 into the wall.

While specific embodiments of the invention have been shown and described in detail to illustrate the application of the inventive principles, it will be understood that the invention may be embodied otherwise without departing from such principles.

We claim:

1. A holder for a self-drilling dowel having a locking-in cone with said holder having an axially extending frusto-conically shaped bore for holding the locking-in cone on the self-drilling dowel, the bore in said holder having a larger diameter first end through which the locking-in cone is inserted and a smaller diameter second end spaced axially from the first end, said holder having an opening extending transversely of and intersecting the bore adjacent the second end thereof for receiving an expelling tool for the locking-in cone, wherein the improvement comprises that said bore has a surface extending in the axial direction thereof for contacting and holding the locking-in cone, said surface having a plurality of recesses extending axially of the bore from the first end thereof toward the second end thereof and outwardly from said surfaces, and said recesses being uniformly angularly spaced apart around said surface of the bore for dividing said surface into a plurality of angularly spaced axially extending strips with said strips holding the locking-in cone.

2. A holder, as set forth in claim 1, wherein said recesses comprise grooves rounded in the direction transverse to the axial direction of said bore.

3. A holder, as set forth in claim 2, wherein the cross section of said rounded grooves taken transversely of the axial direction of said bore having the shape of a circular segment.

4. A holder, as set forth in claim 1, wherein the angular extent of each of the strips of said surface between adjacent recesses being less than sixty degrees.

5. A holder, as set forth in claim 1, wherein an annular depression is formed in said bore intermediate the first and second ends thereof and extending radially outwardly from said surface thereof and being concentric with the axis of said bore, and said depression intersecting said recesses.

6. A holder, as set forth in claim 5, wherein said annular depression comprises a groove.

7. A holder, as set forth in claim 6, wherein said annular depression having a dimension into said holder from said surface of said bore approximately equal to the maximum dimension of said recesses radially outwardly from said surface of said bore.

8. A holder, as set forth in claim 1, wherein said bore comprises three said recesses with the angular extent of said surfaces between each pair of adjacent said recesses being in the range of fifty-sixty degrees.

9. A holder, as set forth in claim 1, wherein said holder comprises an axially extending shank and a head secured to and extending axially from one end of said shank, said shank having a smaller diameter than said head and said bore extending into said head at the opposite side thereof from said shank and in the axial direction of said shank, the larger diameter first end of said bore being located at the opposite side of said head from said shank, said bore having an axial length less than the corresponding axial dimension of said head, and said opening for receiving an expelling tool being located at the smaller diameter second end of said bore and being spaced from the end of said head secured to said shank.

* * * * *